United States Patent
Alon et al.

(10) Patent No.: US 7,546,333 B2
(45) Date of Patent: Jun. 9, 2009

(54) METHODS AND SYSTEMS FOR PREDICTIVE CHANGE MANAGEMENT FOR ACCESS PATHS IN NETWORKS

(75) Inventors: Roee Alon, Boston, MA (US); Assaf Levy, Boston, MA (US); Shai Scharf, Boston, MA (US); Raphael Yahalom, Needham, MA (US)

(73) Assignee: NetApp, Inc., Sunnyvale, CA (US)

( * ) Notice: Subject to any disclaimer, the term of this patent is extended or adjusted under 35 U.S.C. 154(b) by 601 days.

(21) Appl. No.: 11/112,624

(22) Filed: Apr. 22, 2005

(65) Prior Publication Data

US 2005/0256961 A1    Nov. 17, 2005

Related U.S. Application Data

(63) Continuation-in-part of application No. 10/693,632, filed on Oct. 23, 2003.

(60) Provisional application No. 60/420,644, filed on Oct. 23, 2002, provisional application No. 60/564,837, filed on Apr. 23, 2004, provisional application No. 60/565,064, filed on Apr. 23, 2004.

(51) Int. Cl.
    *G06F 15/16* (2006.01)
(52) U.S. Cl. .................. 709/200; 709/229; 709/224; 707/1
(58) Field of Classification Search .................. 709/229, 709/224, 223, 200, 238; 707/1
See application file for complete search history.

(56) References Cited

U.S. PATENT DOCUMENTS

| | | | |
|---|---|---|---|
| 5,825,772 A | 10/1998 | Dobbins et al. | |
| 5,940,819 A | 8/1999 | Beavin et al. | |
| 6,223,176 B1 * | 4/2001 | Ricard et al. | 707/8 |
| 6,240,463 B1 | 5/2001 | Benmohamed et al. | |
| 6,327,598 B1 | 12/2001 | Kelley et al. | |
| 6,636,981 B1 | 10/2003 | Barnett et al. | |
| 6,691,169 B1 * | 2/2004 | D'Souza | 709/242 |
| 6,751,228 B1 * | 6/2004 | Okamura | 370/412 |
| 6,792,503 B2 * | 9/2004 | Yagi et al. | 711/112 |
| 6,795,399 B1 | 9/2004 | Benmohamed et al. | |
| 6,816,927 B2 | 11/2004 | Bouchet | |
| 6,909,700 B1 | 6/2005 | Benmohamed et al. | |
| 7,058,702 B2 | 6/2006 | Hogan | |
| 7,103,653 B2 | 9/2006 | Iwatani | |
| 7,149,886 B2 | 12/2006 | Fujibayashi et al. | |
| 7,194,538 B1 | 3/2007 | Rabe et al. | |

(Continued)

FOREIGN PATENT DOCUMENTS

WO    WO 01/82077    11/2001

(Continued)

*Primary Examiner*—Ario Etienne
*Assistant Examiner*—El Hadji M Sall
(74) *Attorney, Agent, or Firm*—Ropes & Gray LLP

(57) ABSTRACT

Methods and systems for predictive change management in a network are provided. A configuration change can be specified and pre-validated according to the access path policy, before the actual changes are implemented. The conformance of the implemented configuration change with the access path policy is validated after implementation, because of possible consequential effects of the configuration change. If a change in one or more access paths is specified, then associated component events can be simulated before implementation, so that root causes for resulting access path violations can be detected and remedied before the changes are made.

13 Claims, 10 Drawing Sheets

Management Server

U.S. PATENT DOCUMENTS

| | | |
|---|---|---|
| 2002/0145981 A1 | 10/2002 | Klinker et al. |
| 2003/0005119 A1 | 1/2003 | Mercier et al. |
| 2004/0243699 A1 | 12/2004 | Koclanes et al. |
| 2005/0114403 A1 | 5/2005 | Atchison |

FOREIGN PATENT DOCUMENTS

| | | |
|---|---|---|
| WO | WO 02/088947 A2 | 11/2002 |
| WO | WO 03/054711 A1 | 7/2003 |
| WO | WO 2004/111765 | 12/2004 |

* cited by examiner

METHODS AND SYSTEMS FOR PREDICTIVE CHANGE MANAGEMENT FOR ACCESS PATHS IN NETWORKS

CROSS-REFERENCE TO OTHER PATENT APPLICATIONS

This application is a continuation-in-part of U.S. patent application Ser. No. 10/693,632, filed Oct. 23, 2003, which claims the benefit of U.S. Provisional Patent Application No. 60/420,644, filed Oct. 23, 2002. This application also claims the benefit of U.S. Provisional Patent Applications No. 60/564,837 and 60/565,064, both filed Apr. 23, 2004, the contents of all of which are incorporated herein by reference in their entirety.

BACKGROUND OF THE INVENTION

Changes to IT infrastructures are the prime reasons for problem, disruptions, and vulnerabilities in such environments. The number of such changes in most environments is high due to growth, changing needs, and technological progress. Each such infrastructure change often consists of multiple individual tasks which need to be performed consistently, potentially in different locations by different persons. In most environments there are no effective end-to-end automated feedback mechanisms to ensure the consistency, which is important for changes to end-to-end access paths in data network infrastructures. Data networks are employed to transmit messages and data from a network appliance which initiates a network event, such as a query or a data transfer, subsequently also referred to as an initiator, application, server or host, to another network appliance which can respond to the event, for example, a data storage device. In various types of networks, for example Storage Area Networks (SAN), defined access paths between the network appliances may have to conform to an access path policy. The defined access paths are physical and logical pathways, which can include the initiators, their particular components and ports, such as Host Bus Adapters (HBA), a switch fabric with switches, routers and the like, and end devices, such as physical storage devices, containing Logical Unit Numbers (LUN). The state of each of the components has to be properly logically configured to enable appropriate flow along the pathway. In addition, the pathways typically have to comply with a policy, also referred to as access path policy, which includes policy attributes, such as path redundancy, path connectivity characteristics, and the like.

One example of a data network with defined access path is a storage area network which enables multiple applications on servers access to data stored in consolidated, shared storage infrastructures. Enterprises increasingly deploy large-scale, complex networks to gain economies-of-scale business benefits, and are performing and planning extensive business-critical migration processes to these new environments.

Data networks are constantly undergoing changes, upgrades and expansion, which increases their complexity. The number of components and links which may be associated with the data transfer between a given initiator and one or more of its data network appliances may increase exponentially with the size of the network.

This complexity, which is compounded by the heterogeneity of the different network devices, leads to high risk and inefficiency. Changes to the network, which can happen frequently, may take a long time to complete by groups of network managers, and are error-prone. For example, in many existing enterprises a routine change, such as adding a new server to a network, may take 1-2 weeks to complete, and a high percentage (sometime 30-40%) of these change processes include at least one error. It is estimated that around 80% of enterprise outage events are a result of events related to changes in the network infrastructure.

To implement the access relationships and related access characteristics, multiple underlying devices of different types and related physical/logical access paths between these devices need to be set up. The physical and logical set-up can include multiple actions (sometime tens per a single logical change), which need to be set up at different locations and with device types, with perfect mutual consistency.

It would therefore be desirable to detect inconsistencies in the physical and logical access paths when planning changes in the network, to analyze these inconsistencies and to remedy the inconsistencies before the actual implementation of the changes.

SUMMARY OF THE INVENTION

The invention addresses the deficiencies in the prior art by, in various embodiments, providing methods and systems for making predictive changes to access paths in networks.

The predictive change management process includes both pre-validation consistency checks before actions are taken, and post-validation consistency checks after the action are taken. The consistency checks consider the current state of the access paths in the network, the current state of the access path policy and the set of new events, planned or executed, to determine conformance, or establish violation and its root cause.

Planned changes in devices and device configurations of the devices connected to the network fabric and to the network fabric itself are analyzed and mapped to a consistent global snapshot of the network. A consistent global snapshot of a network is a representation which correctly reflects the actual status of all of the end-to-end access paths in the network at a particular point in time that are consistent with or conform to a defined network access path policy.

The status of each access path includes high level path attributes derived from the physical and logical characteristics of the components which provide the access relationship between a given application and a storage LUN.

A management server automatically collects information from devices distributed across the network using a variety of non-intrusive mechanisms. It identifies violations of actual access paths relative to the required access paths as determined by the policy. It provides notifications about violations, with all their relevant context information, to the management server or to another appropriate recipient.

The management server collects information about planned events, i.e., before they are physically implemented, and after they happen, and analyzes using network-customized graph-based algorithms their impact on any network access path and the compliance with the access path policy.

According to an aspect, the invention provides a process for predictive change management of access paths in a network, which includes specifying one or more planned change tasks, pre-validating the one or more planned change tasks according to an access path policy of the network, implementing the one or more planned change tasks, tracking implementation of the one or more changes, and post-validating the implemented changes for conformance of with the access path policy.

According to another aspect, the invention provides a process for managing an access path change in a network, which includes specifying a change in an access path policy in the network, associating with the specified change at least one component event, determining an effect of the least one component event by evaluating conformance of the changed access path policy, and in the event of nonconformance, determining a root cause for the nonconformance.

Advantageous embodiments of the invention may include one or more of the following features. A planned change task may include adding, removing and/or changing a physical network component, a physical link between network components, a port configuration and/or a LUN mapping. The physical component can be a storage device, a switch or a server. The access path policy may be updated by adding an access path to the policy, deleting an access path from the policy, or changing an attribute of an access path. Moreover, a planned change task may involve modifying an access path attribute.

Pre-validating may include detecting a nonconformance of access paths with the access path policy and modifying the planned change task to conform the access paths to the access path policy. Post-validating may include detecting a nonconformance of the implemented change with the access path policy and notifying a user or determining a root cause of the nonconformance. The root cause may be determined from a logical order and/or a temporal order of the component event, and by generating an event sequence based on the logical and/or temporal order. Generally, the root cause can be associated with a first event in the event sequence and may be eliminated by proposing a correction of one or more access paths.

Generating the event sequence may include determining a relative order of the component events based on semantics of a timestamp, a route for transmission of a timestamp, a multiplicity of messages with different timestamps for an identical event, and/or a causal relationship between events.

A planned change task, a pre-validated change task, an implemented change, and/or a post-validated configuration change may be visualized graphically and/or textually.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

FIG. 6 shows an exemplary visualization of a access path change plan and pre-validation;

FIG. 7 shows an exemplary textual visualization of a change execution tracking;

FIG. 9 shows an exemplary textual and graphical visualization of a violations analysis.

DETAILED DESCRIPTION

Figure 1:
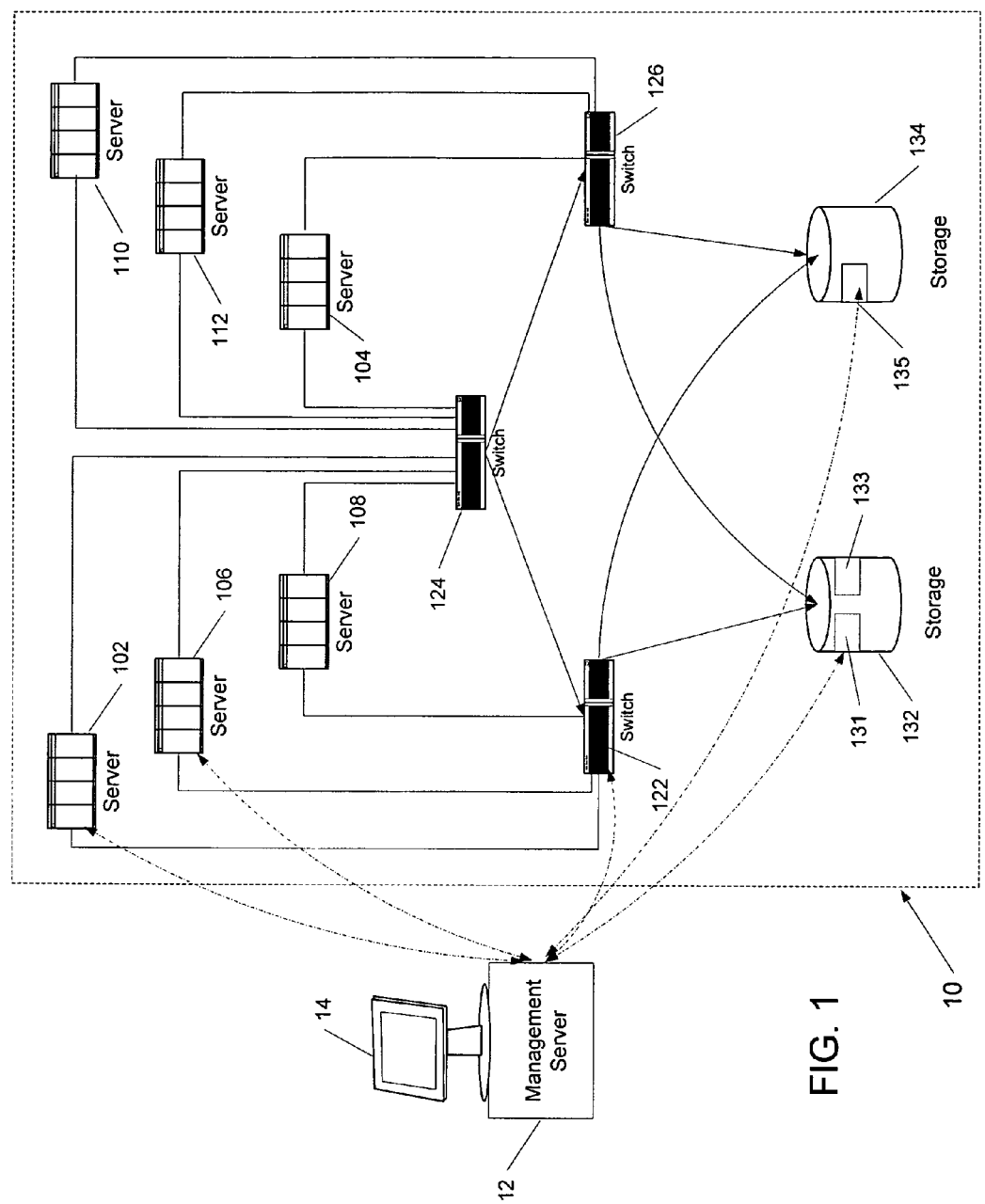
FIG. 1 shows a schematic diagram of an exemplary network with physical links and a management server according to the invention.

The methods and systems described herein enable efficient, effective, and risk-free changes to access path environments in which multiple initiators on multiple network appliances, such as servers or applications, can access (read and write) data which is stored on multiple other shared network appliances, such as storage devices. Exemplary embodiments of the methods and systems will be described with reference to a SAN having specialized SAN devices (such as different types of switches) which are interlinked, and may employ various transfer protocols (such as Fibre Channel and iSCSI). Each server is connected to the network through one or more specialized network cards (such as a Host Bus Adapter, or HBA). Application data can be stored on a storage device in storage units called LUNs (LUN=Logical Unit Number). Although the invention will be scribed with reference to a SAN, a SAN is only one particular example of a network with defined physical and logical access paths and an associated access path policy, and it will be understood that the invention can be used with other types of networks, such as local area networks, wide area networks, extranets, remote-site connections, inter-domain networks, intranets, and possible the Internet, as long as access paths can be defined, set up, and monitored in such a network.

In the context of the invention, the following terminology will be used:

Access Path—a physical and logical connection or link between components in a network, which enables an initiator on one node of the network to access a data set on another node, while disabling other initiators from accessing the same data set, unless provisions are made for controlled sharing of the same data between several initiators. More particularly, when applied to the exemplary storage area network (SAN), the term Logical Access Path refers to a logical channel between a given application and a given LUN along which data can flow. The logical state (configuration state) of each component along the way in that sequence (for example the HBA, the storage controller, and each of the switches) is set so as not to disable data flow between that specific application and that specific LUN along that specific sequence of components.

Access Path Attributes include specifications for each access path. For example, an access path must exist between an application server in a network and a storage LUN, and it may also be stipulated that an access path must not contain more than two hops to reduce latency.

Access Path Policy—specifies the attributes of all the access paths, i.e., which paths should exist, and required end-to-end properties for each of these access paths at any given point in time. For example, the access path policy can specify redundancy and replication of components and network appliances, latency, constraints on component types inter-connections along the path, etc. All access paths in the environment, or at least all access paths which are members of a specified sub-group must adhere to the access paths policy rules. The policy rules and attribute policy are checked for internal consistency and may be stored in a policy repository.

Access Path Event—a physical or logical change of a state of one of the components which are part of an access path. An access path event can be caused, for example, by a node failure, a faulty cable connection, or a change in a cable connection, or a zone configuration change.

Access Path Violation—a discrepancy at some point in time between the access path policy and the access paths in the network environment, which can be caused by an access path event and can be reflected, for example, in the existence/absence of an access path or in a change in the properties of one or more of the existing access paths.

FIG. 1 shows a topological view of an exemplary network 10, such as a storage area network (SAN), with several network appliances, for example peripherals such as servers 102, 104, 106, 108, 110, 112, switches 122, 124, 126, and application data storage devices 132, 134. The storage devices can be, for example, disk drives, such as RAID devices, tape drives, or other types of mass-storage devices. The physical connection paths between different network appliances are indicated by solid lines. Not all physical access paths are also logical access paths, because some physical access paths alone or in combination with other access paths may have characteristics that cause nonconformance with the access path policy. The storage devices 132, 134 can be further partitioned into data storage regions, such as unique LUNs 131, 133, 135.

The network 10 of FIG. 1 includes a management server 12 which for the exemplary network 10 is configured to communicate with various network components, including network appliances, i.e., the servers 102, 104, 106, . . . , 112, the storage devices 132, 134 and respective LUNs 131, 133, 135, and switches 122, 124, 126, to monitor the network and network resources and assure conformance between the logical access paths and the access path policy. This communication can take place via the communication channels used by the network for data transfer or via separate communication channels.

Figure 2:
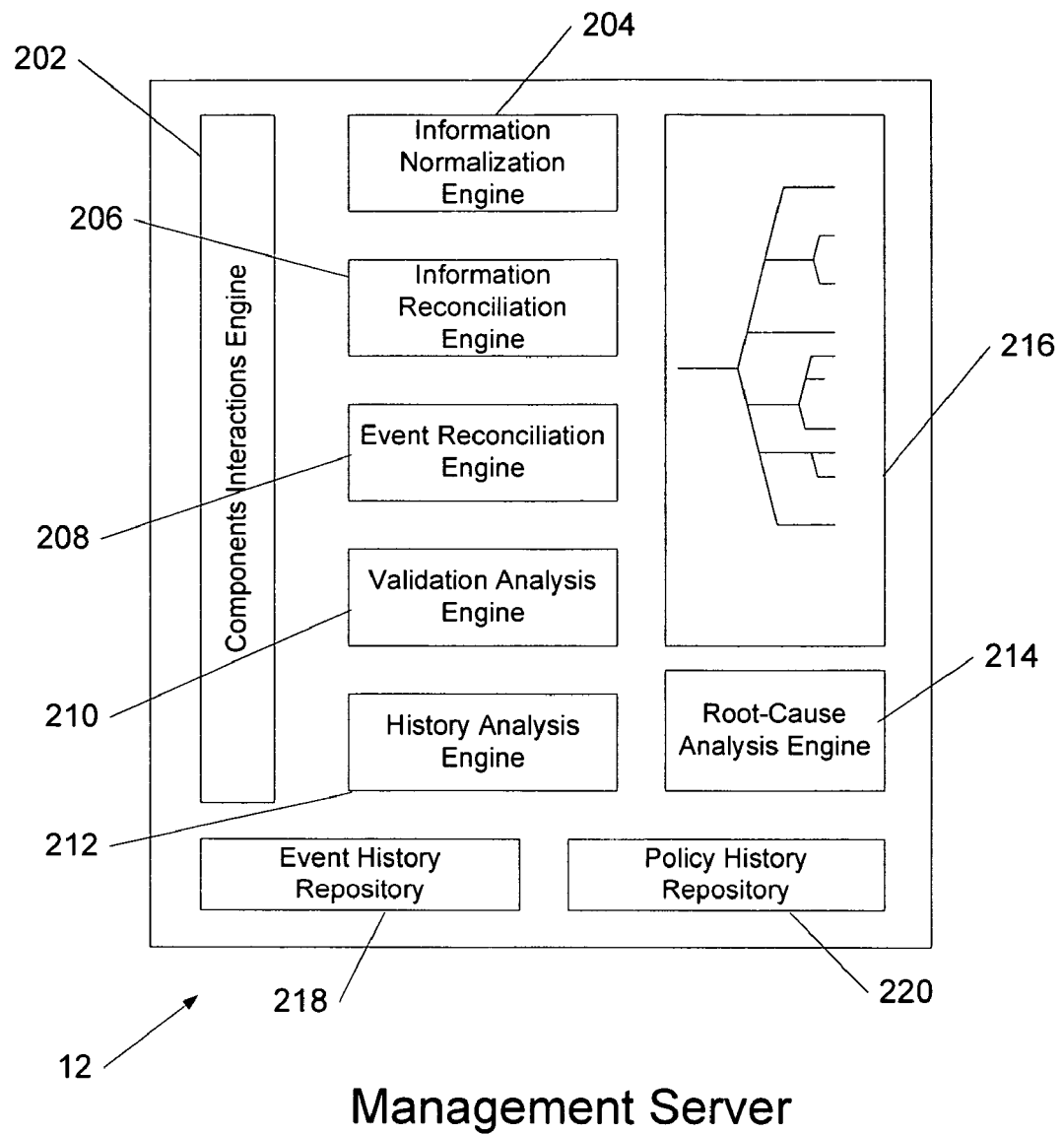
FIG. 2 shows details of the management server of FIG. 1.

FIG. 2 shows in more detail an exemplary configuration of the management server 12. The management server 12 can include, inter alia, a Components Interaction Engine 202 which obtains information from the various network components in a manner described above. An Information Normalization Engine 204 converts the obtained information to a standard, device-independent representation, with the Information Reconciliation Engine 206 reconciling conflicts, removing redundant information and identifying incomplete information. Event Correlation Engine 208 establishes relationships between events and establishes an temporal and logical event sequence. The Validation Analysis Engine 210 compares the actual access paths with the access path policy and identifies access path violations. History Analysis Engine 212 selects events, for example, based on their causal relationships, filters events according to defined filter criteria, and performs statistical and trending analysis. The Root Cause Analysis Engine 214 analyzes the root cause(s) of detected violations and can optionally generate a root cause decision tree 216. An Event Repository 218 stores access path violations, events leading to these violations, root causes, etc., whereas a Policy History Repository 220 stores access path policies and changes in the access path policies.

Figure 3:
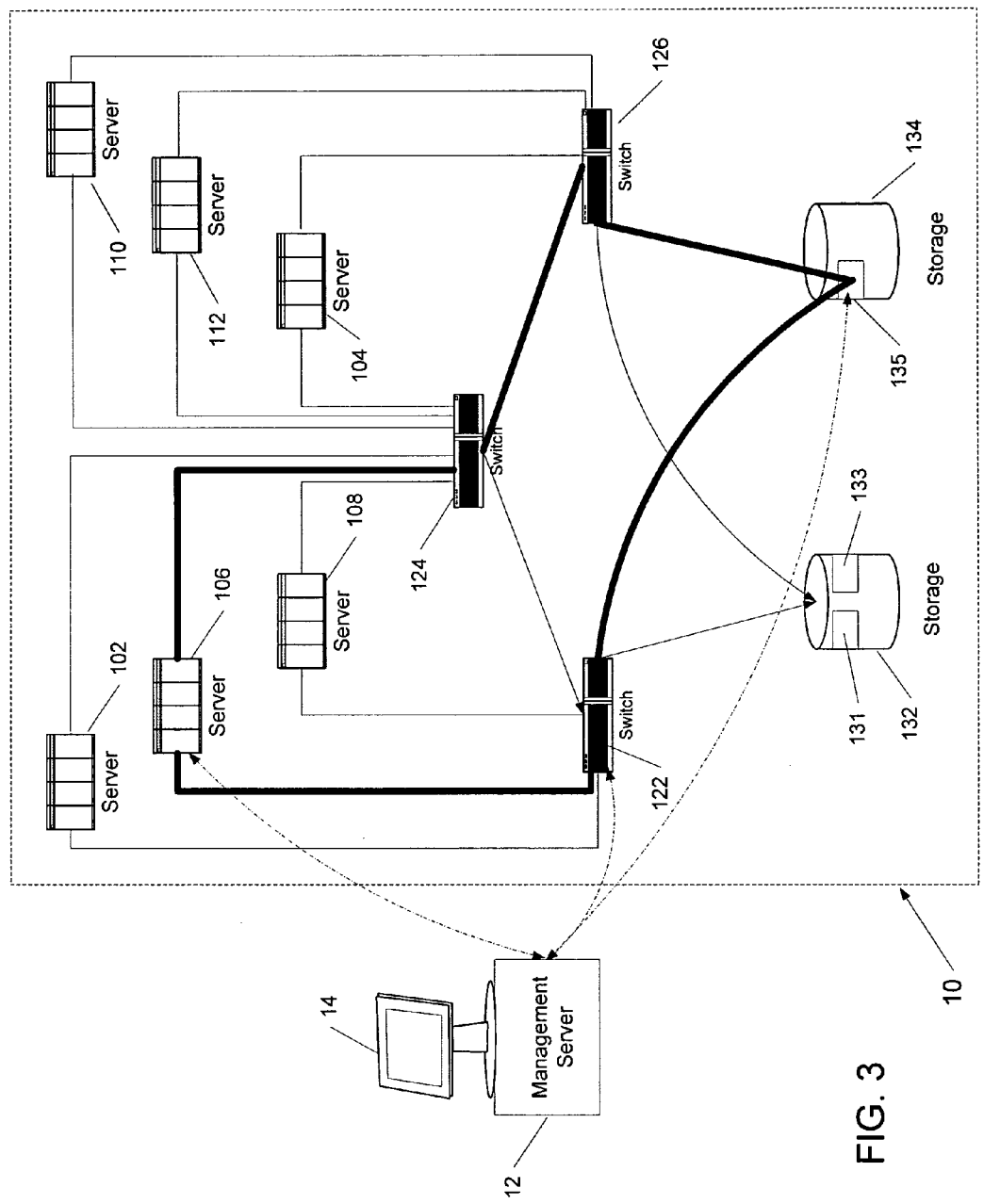
FIG. 3 shows two exemplary logical access path between a server and a storage device that comply with a network access path policy.

FIG. 3 depicts the exemplary network 10 with logical access paths (shown as bold lines) set up between a network appliance 106, such as a server or an application, and a LUN, such as LUN 135, on storage device 134. The intermediate components along the access path include, among others, intermediate nodes, such as switch 122 in one of the logical access paths, and switches 124, 126, in the other access path. It can be inferred from the network diagram of FIG. 3 that the access path policy requires redundant access paths. It will be understood that the illustrated network configuration serves as an example only, and that the configuration and routing of the access paths will depend on the type of device and number of devices employed at the network nodes (e.g., switches 122, 124, 126). Each network device may be set to logically constrain traffic flows through that device to specific respective end-points only (using different methods depending on the type of device and on the vendor). For example, each switch typically supports the definition of different type of zones which are sets of device ports between which data may flow via that switch. Storage devices typically support LUN masking which imposes constraints on the servers that may access a LUN. Similarly, a server's HBA (host bus adapter) typically supports types of LUN masking that constrain which LUNs can be accessed from that particular server.

Consequently, to enable a data flow end-to-end from a particular given initiator or application to a particular given data LUN, both physical constraints (at least one physical path must exist between the corresponding server and the corresponding storage LUN) and logical constraints (the zoning in each switch and the LUN masking at the HBA and storage device should be set so as not to disable data traffic between these end points) need to be satisfied in all the devices along that route.

For example, the logical setup on each of the two HBAs on server 106, the zone set up in each of the switches 122, 124, 126, as well as the LUN masking 135 at the storage device must be set to enable flows along each of these logical channels between these two end points 106 and 135. For example, the zoning on switch 122 needs to be defined such that the port corresponding to server 106 and the other port corresponding to the storage device of LUN 135 are in the same zone. Logical access paths can include associated path attributes which can be considered as particular properties that characterize each end-to-end Logical Access Path, describing, for example, aspects of availability, performance and security of each given end-to-end logical channel. In other words, given a particular logical access path, a particular value can be computed for each one of the defined attributes (that value represents a particular property value for that logical access path instantiation).

The computation of a particular attribute value for a given logical access path, also referred to as path attributes, can be based on information related to the sequence of linked components, as well as on information about the types and internal configuration states of any number of components contained in that logical access path. The path attributes represent the characteristics of the end-to-end data flow between an initiator and its data. The path attributes relate to, for example, levels of end-to-end availability, performance, and security, all of which characterize data flows along a logical access path.

Predictive Change Management, as described below, is designed to improve the reliability and efficiency of access path change processes in IT infrastructures, such as managed networks having an access path policy, for example, storage area networks (SAN). According to one embodiment, the management server 12 interacts with the network appliances and network resources in the network fabric and implements a process with the following main aspects:

Specifying an Access Path Policy or a change in the current Access Path Policy
    Determining a current valid global state of the network
    Specifying a proposed change event in network
    Pre-validating the proposed change event
    Implementing the pre-validated change
    Validating the implemented change
    Updating the global state
    Record changes and implications for validation as an audit trail Before contemplating a change in the current network configuration that could potentially affect the access paths, the management server receives state information from the various network appliances and fabric components, correlates the information, reconciles inconsistencies, and constructs a representation of the current state of the infrastructure environment and of all access paths that exist in the environment at that point in time, as well as their access path attributes.

The representation of the existing access paths and path attributes is compared with the corresponding representation in the access path policy repository 214 of the management server 12 (see FIG. 2), violations are identified, and appropriate notifications are generated. The types of possible violations include, without being limited thereto, "access path does not exist", "access path should not exist", and "access path attribute value discrepancy". When appropriate corrective actions are taken, the server obtains the updated state information, and the violations are deleted from the list.

Access path policy may change by, for example, adding one or more new access paths between two network appliances (with particular attributes), deleting one or more access path, or changing access path attributes. The network configuration can change due to one or more actions related to component changes, such as: connecting or removing a link between two device ports; connecting devices to or disconnecting devices from links; and/or changing a logical access state configuration on a device to enable data flows between devices and/or ports. For example, the action "logical access configuration change at device R" is mapped to a detailed zoning configuration or LUN masking.

Figure 4:
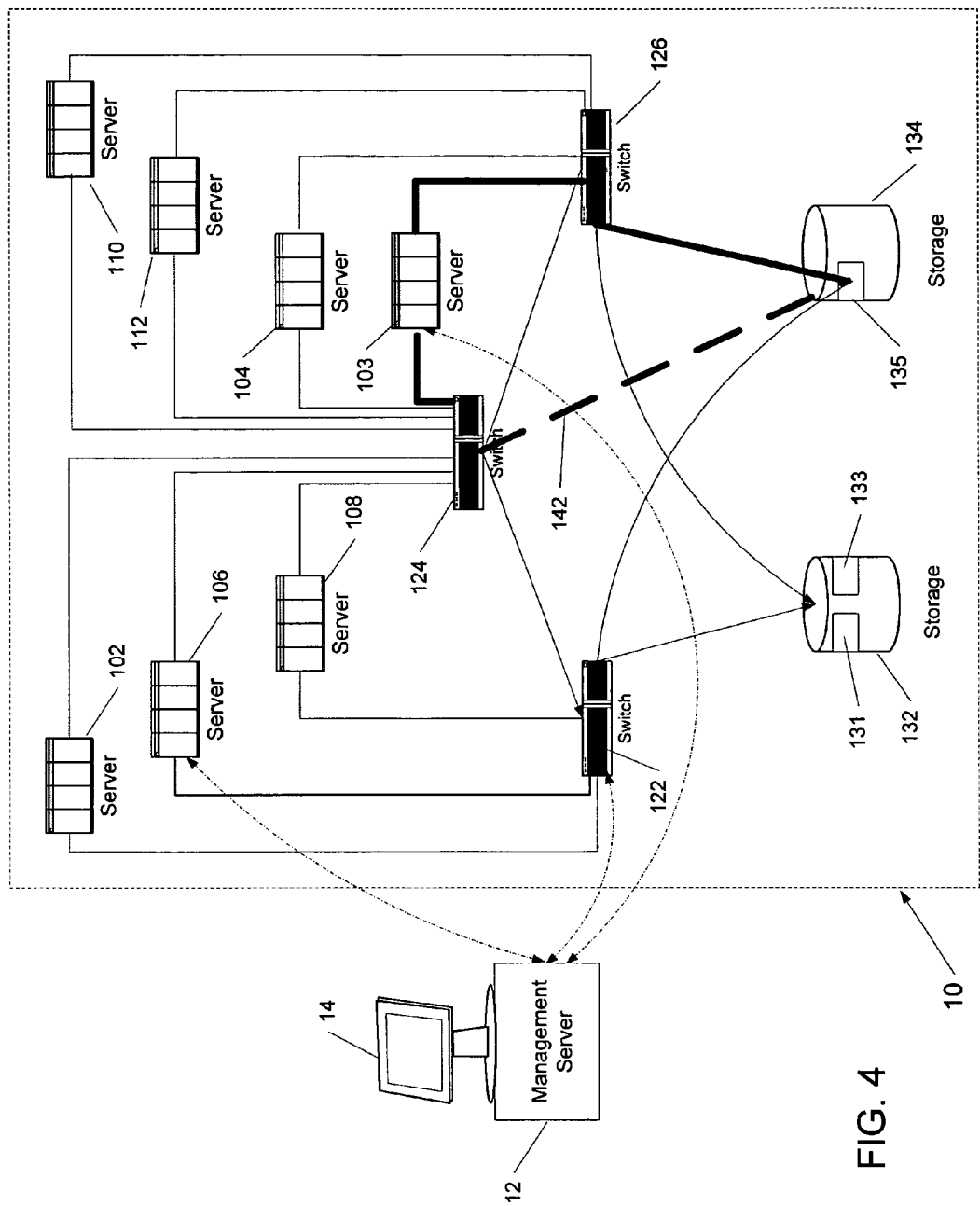
FIG. 4 shows a planned change in the logical access paths of the network after adding another server.

Referring now to FIG. 4, in the depicted example, a new server 103 is slated to be added to the network. The network policy stipulates that the server 103 is connected to storage LUN 135 with dual fabric redundancy and no more than one hop to maintain a low latency. One access path meeting this access path attribute can be established between an HBA of server 103 and LUN 135 via switch 126. However, a second possible access path via switches 124 and 122 has two hops and therefore violates the access path attributes. No second access path exists that only includes a single hop. Accordingly, a new access path 142 is established between switch 124 and LUN 135. Although no additional network components are required and no other changes need to be made to add the access path 142, this may not be the case in larger and/or more complex networks. Adding or changing one or more access path may involve addition or reconfiguration of a number of components, which may in turn affect other access paths that previously conformed to the access path policy.

Figure 5:
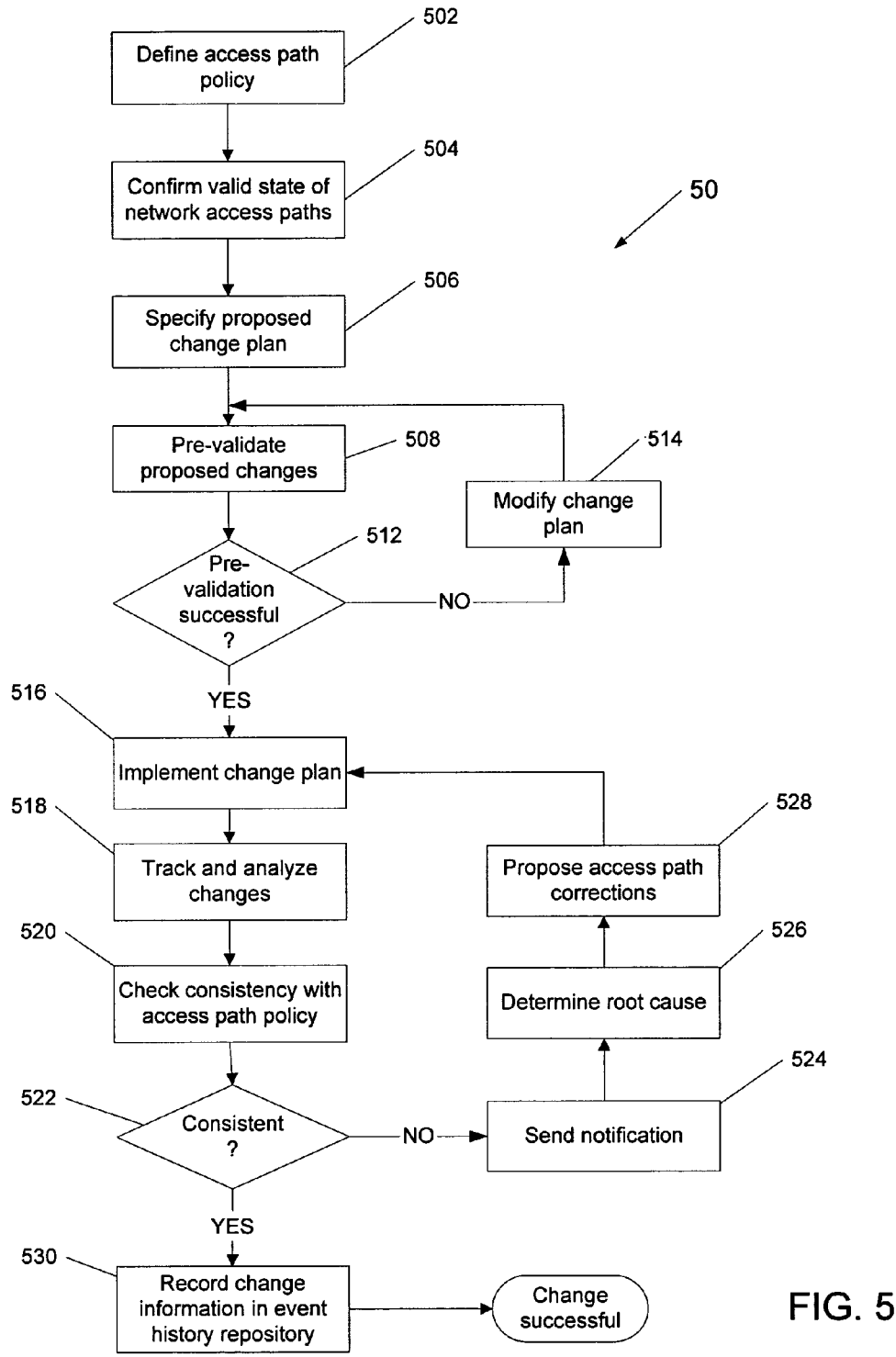
FIG. 5 is a schematic high-level flow diagram for managing predictive changes to access paths in a network.

FIG. 5 shows an exemplary process 50 for predictive change management according to the invention. The sequential order of the depicted steps may be changed and additional process steps may be performed as long as the illustrative process enables predictive change management of access paths in a network.

The network is presumed to have a defined access path policy, step 502, so that a valid state of existing access paths can be established and confirmed, step 504. A proposed network change plan is specified, which may add and/or change physical network components, links, port settings, LUN masking, and the like, step 506. The details of each proposed change in the plan are pre-validated after specification and before their implementation, step 508. Pre-validation is performed by simulating the effect of constituent proposed actions, i.e., the addition of server 103 and the two redundant links via switch 124 and 126. In addition, the effect of these actions on the representation of the infrastructure is determined, and any deviations in the resulting state representation from the specified required policy rules are identified.

Specifically, the effect of each action on the environment is simulated and a list of access paths is derived. For example, a specific logical configuration update of a single component can open new access paths, close existing access paths, as well as change some attributes of existing access paths. For example, the addition of path 142 between switch 124 and LUN 135 also opens connections between servers 102, 106, 108 and LUN 135 having a lesser number of hops. Any identified deviations from policy are presented, analyzed, and can be corrected, simulated, and pre-validated again in an iterative process, step 514.

The result of a successful pre-validation phase is a detailed execution plan for the change which includes the actions to be performed including their detailed device-specific action implementation details. By collecting and analyzing time-stamped information from the various components in a simulated implementation, a root cause for an access path failure can be determined before the changes are implemented, as discussed below. Accordingly, necessary repairs and an access path reconfiguration can be easily and predictably pinpointed and cost-effectively performed.

Once the proposed change plan is pre-validated, it may be implemented in the infrastructure environment based on a pre-established action plan, step 516. The change implementation can be performed in a variety of ways, including physical changes in the environment (re-cabling, connecting components), logical re-configuration using component-specific management interfaces or other provisioning solutions. Different parts of the change plan can be implemented in parallel by diverse IT personnel.

The actual implementation of the change plan is continuously tracked and analyzed by the server based on update messages received from the components in the network and mapped to the change execution plan and the access path policy, step 520. The server records the individual state change actions (what was performed, where, when, by whom), and the evolving network state until the planned changes are completed.

Validation of each implemented change includes establishing its consistency with respect to the pre-validated change plan as well as its consistency with respect to the specified policy, step 522. Any deviation from the change plan or from the specified policy triggers appropriate notifications, step 524.

Each such notification can include context information suggesting a root cause, step 526, and/or specifying proposed corrective actions, step 528. A root cause is defined as an event in the network fabric that causes a violation of access path policy, without being itself caused by an earlier, correctly time-stamped event that violated the access path policy. A process for determining the root cause of an access path violation is described, for example, in the concurrently filed U.S. patent application titled "Methods and Systems for Constructing and Analyzing End-to-End Access Path Histories in Data Networks" by the same inventors.

The process 50 then returns to step 516, so that each corrective action can be iteratively processed through the predictive change phases cycle, or parts of it, until successful completion. After all changes have been implemented and found to be consistent with the access path policy, as determined in step 522, also referred to as post-validation, details of the performed changes can be recorded in an access path history file, such as the Event History Repository 218 (see FIG. 2), which can be maintained as long as necessary for future reference, for change cycle statistics, and as a guideline for managing future access path changes.

Post-validation of the changes may be necessary not only because certain actions, for example, installation of a cable connection, may have errors, but also other access path may have been affected by the changes, or other access paths may have been changed from their state before pre-validation due to events unrelated to the specifically implemented changes.

Whenever the management server detects an access path violation, for example, caused by a component event, the server determines whether the access path was ever set-up correctly, i.e., did not have a preceding violation. If the access path had been set-up correctly, then at least the subset of access paths associated with the access path event history of that path is examined, and the earliest state change in the event sequence from a state without a violation to a state with a violation is identified as the root cause. The state change is presented, for example displayed on display 14, with its context information, including the corresponding low-level component events. Determining the appropriate corrective action is described below. In most situations, i.e. in the absence of consequential components events that lead to failure of another device, or of other unrelated component events, remedying the root cause will cure the access path violation due to the root cause.

If, on the other hand, the access path associated with the violation was not set up correctly (for example, because access path is just being constructed in conjunction with a specific policy update event), then the root cause of the violation may be due to one or more "missing state changes." Identifying these missing state changes is performed as part of the corrective action analysis in step 528.

The process of establishing the appropriate corrective actions for a given violation is performed by a combination of several approaches. For certain types of the root cause events and violations, a corresponding counter-event mapping is pre-defined. In general, a graph-analysis is performed to determine the optimal route (or change state sequences) which will lead from the current access path state (which includes the violation) to the target state (as specified by the corresponding policy). This analysis can also be supported by a knowledge-base representing pre-defined network procedures that can provide multiple options to users in cases where no single final determination about the best corrective action can be derived. A planned change task, a pre-validated change task, an implemented change and/or a post-validated configuration change can be displayed graphically or in a text window, with tasks that have been performed or that still have to be performed, marked on the graphs or in the corresponding text fields.

Figure 6:
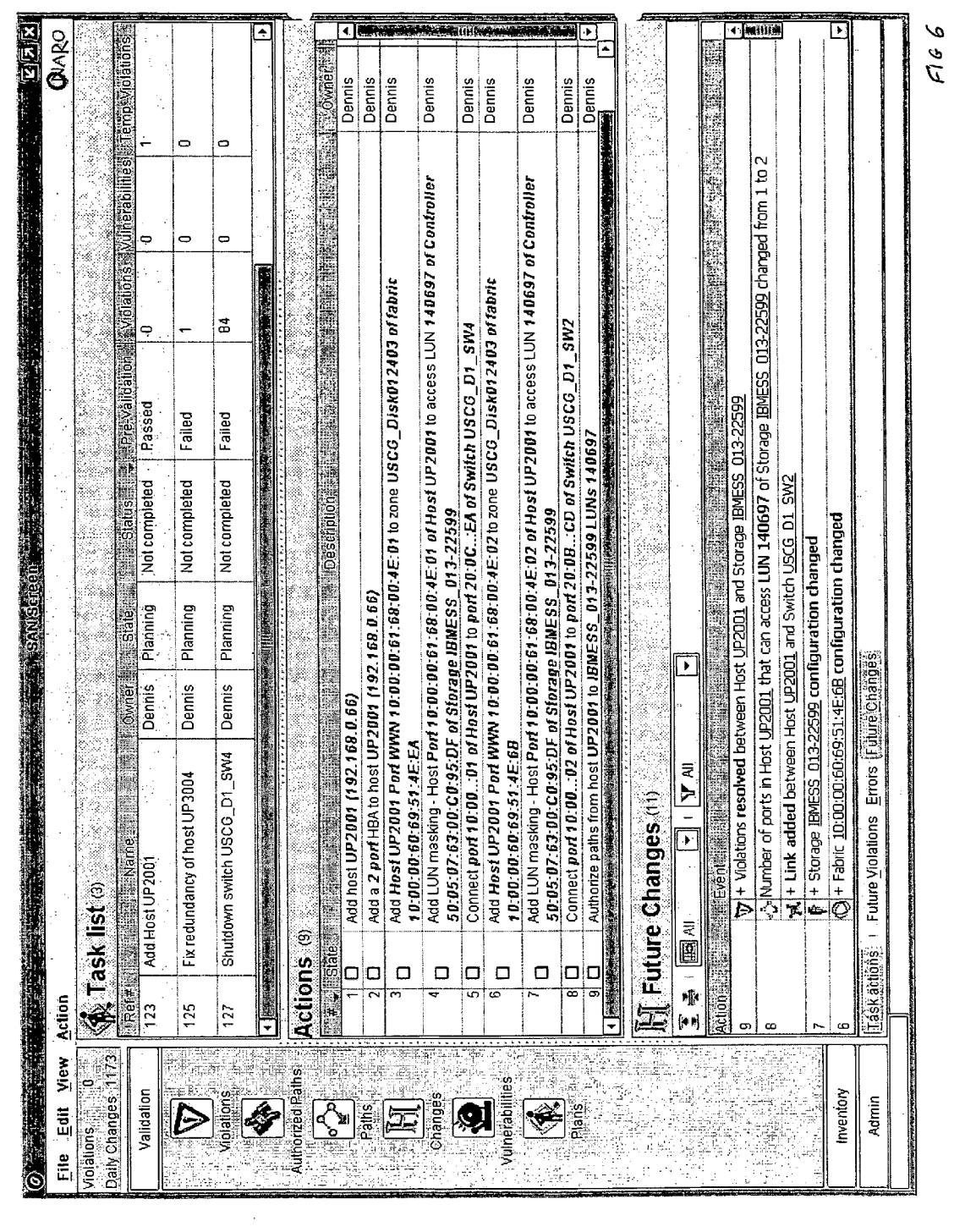

FIG. 6 represents an example of a visualization of access paths change plan to be pre-validated. Outlined are the planned high level tasks, the detailed change low-level individual actions to be pre-validated and performed, and the consequent future changes implied by these low-level actions. The pre-validation is performed based on the current state of the access paths in the network, the access path policy, and the set of planned low-level actions. Any future violation implied by these is detected, highlighted, and notifications are generated.

Figure 7:
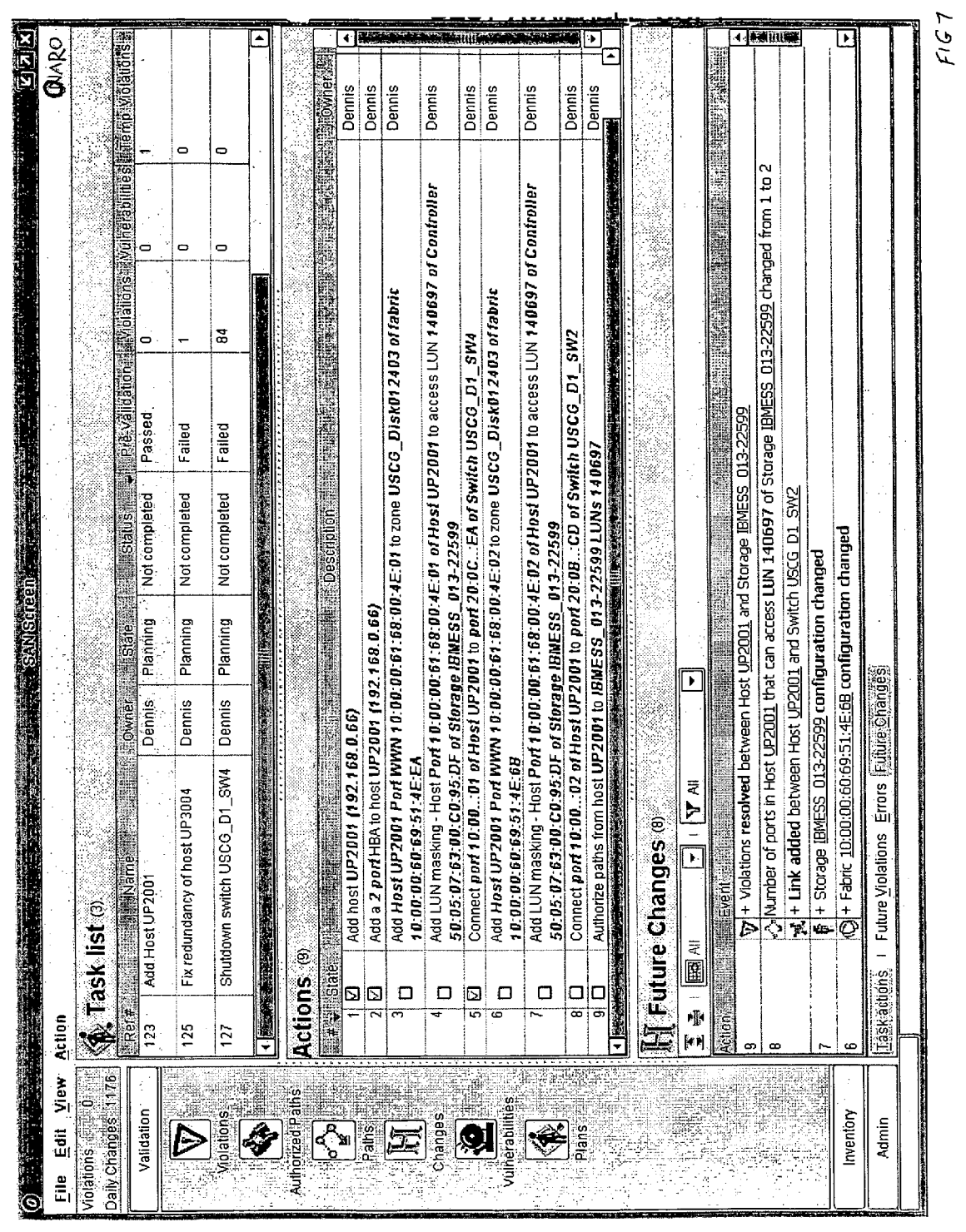

FIG. 7 represents an example of a visualization of change execution tracking. Outlined are these low-level actions which the system detects as being completed, by interacting with the components in the network environment. In the example, the system detected that actions 1, 2, and 5 of the plan were the only ones completed at that point in time, as denoted by the ticks inserted to the boxes next to these.

Figure 8:
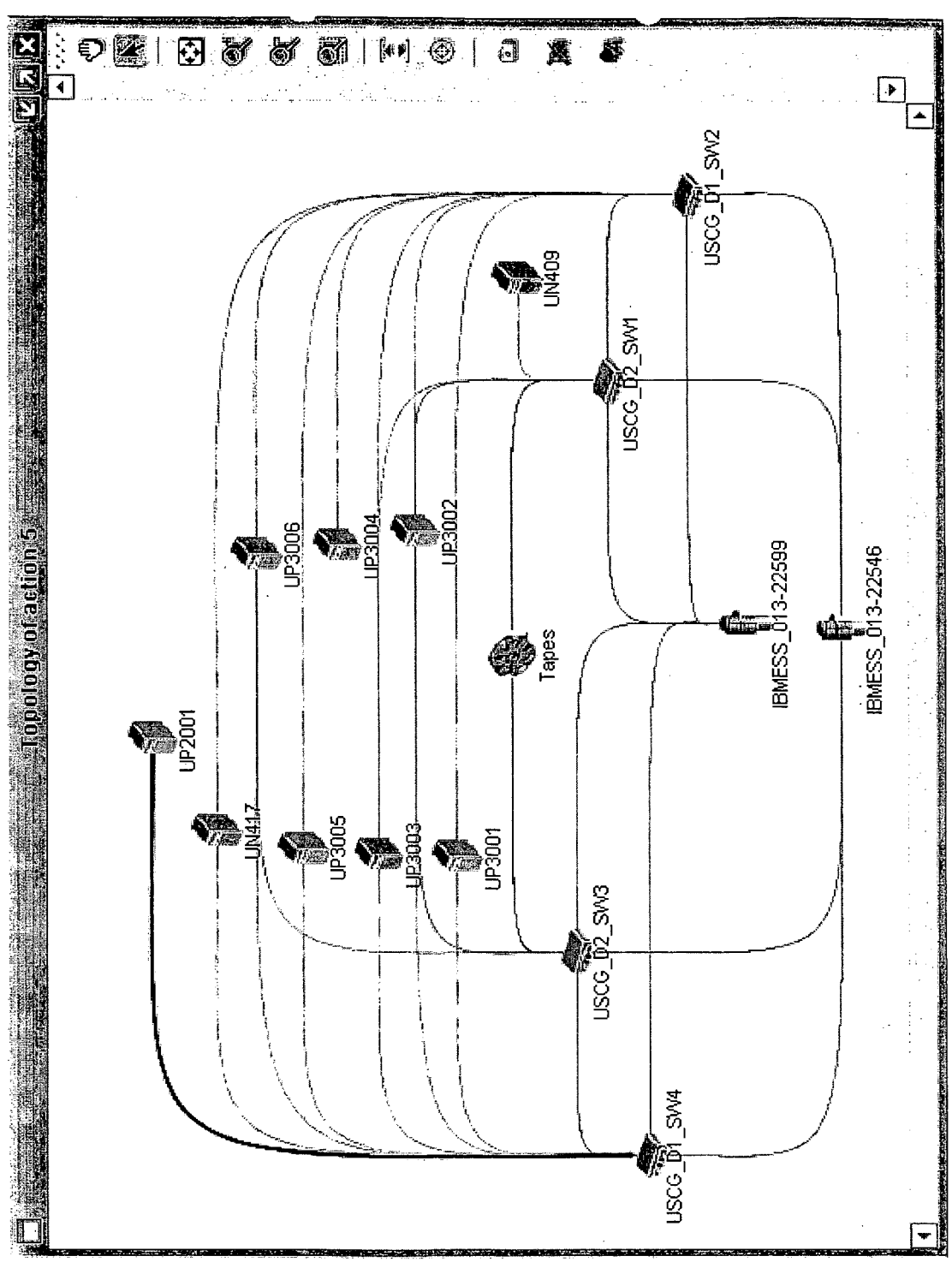
FIG. 8 shows an exemplary graphical visualization of a change execution tracking.

FIG. 8 represents an example of a graphical visualization of change execution tracking. The current state of the network and access path is depicted, with the impact of the latest detected change action highlighted. In this example the state of the network is depicted after the execution of action 5 in the plan, in which a cable was connected between component UP2001 and component USCG_D1_SW4.

Figure 9:
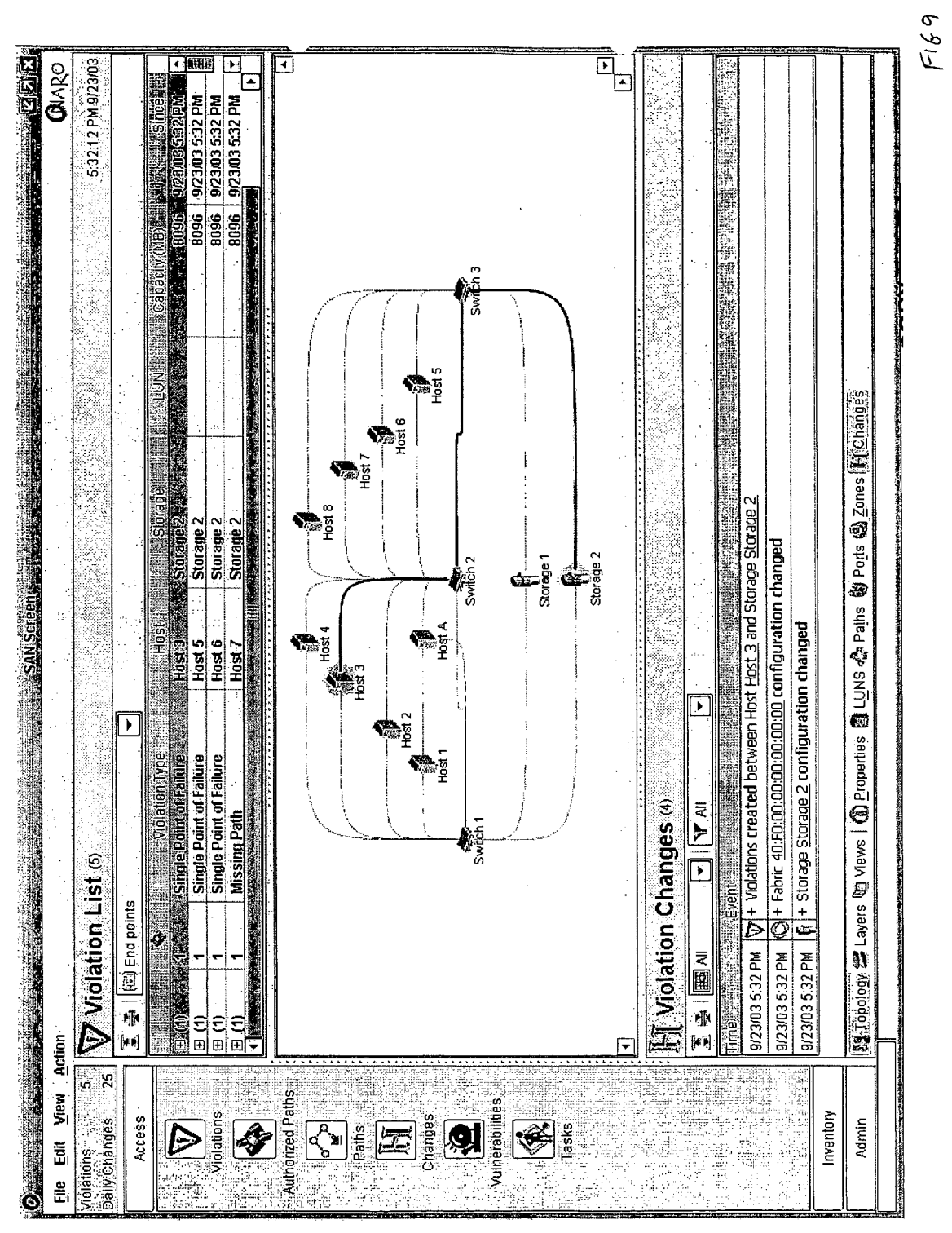

FIG. 9 represents an example of a textual and graphical visualization of violations and their analysis. Depicted are a list of violations detected in the environment at a particular point in time, for each the graphical representation of the affected access paths, as well as the details of the changes that are associated with these violations. For example the $1^{st}$ violation shown represent a redundancy violation in an access path between host 3 and storage 2, created by a change that occurred Sep. 23, 2003 at 5:32 pm.

Figure 10:
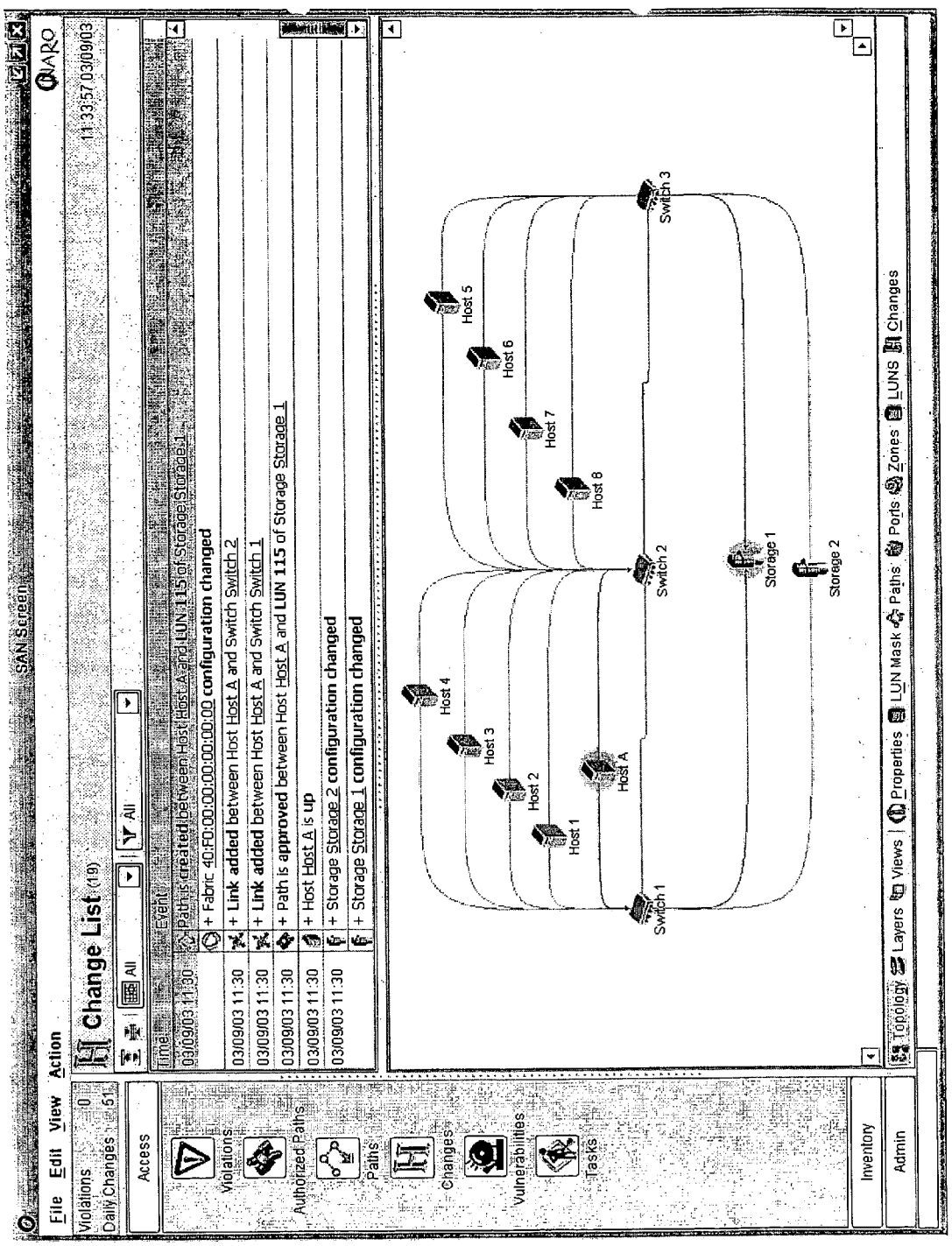
FIG. 10 shows an exemplary textual and graphical visualization of a change recording and history management.

FIG. 10 represents an example of a textual and graphical visualization of change history. It contains all the change events that occurred in the system at any point in the past up to now, ordered correctly on a timeline. For each change event, context information is provided, and the state of the access paths in the network at the point in time in which the change event occurred, is depicted graphically.

While the invention has been disclosed in connection with the preferred embodiments shown and described in detail, various modifications and improvements may be made thereto without departing from the spirit and scope of the invention. By way of example, although the illustrative embodiments are depicted with reference to a storage area network (SAN), this need not be the case. Instead other networks with defined access paths may employ the method of the invention, and the network fabric may include any type of device that provides the described connectivity between network appliances. Accordingly, the spirit and scope of the present invention is to be limited only by the following claims.

What is claimed is:

1. A process for predictive change management of access paths in a network, comprising:

specifying one or more planned change tasks, wherein specifying a planned change task includes at least one of adding, removing and configuring a physical network component, a physical link between network components, a port configuration, or a logical unit number (LUN) mapping, forecasting the effects of the planned change tasks according to an access path policy of the network, wherein forecasting the effects includes predicting the effects of the changes to the network, and wherein access paths in the network represent end-to-end access relationships between an application on a server and data LUNs stored on storage devices in the network, and wherein the access path policy comprises a set of access paths and access path attributes, implementing the one or more planned change tasks, tracking implementation of the one or more changes, and determining the effects of the implemented changes for conformance with the access path policy, wherein determining the effects includes detecting a nonconformance of the implemented change with the access path policy.

2. The process of claim 1, wherein the physical component is selected from the group consisting of storage device, switch and server.

3. The process of claim 1, wherein the access path policy is updated by adding an access path to the policy, deleting an access path from the policy, or changing an attribute of an access path.

4. The process of claim 1, wherein specifying a planned change task includes modifying an access path attribute.

5. The process of claim 1, wherein forecasting the effects includes detecting a nonconformance of access paths with the access path policy and modifying the planned change task to conform the access paths to the access path policy.

6. The process of claim 1, wherein determining the effects includes detecting a nonconformance of the implemented change with the access path policy and determining a root cause of the nonconformance.

7. The process of claim 6, further including proposing a correction of at least one access path to eliminate the root cause.

8. The process of claim 1, further including visualizing graphically or textually, or both, a planned change task, a forecasted change task, an implemented change, or a configuration change, or a combination thereof.

9. A process for managing an access path change in a network, comprising:

specifying a change in an access path policy in the network, wherein specifying a change includes modifying an access path attribute, wherein access paths in the network represent end-to-end access relationships between an application on a server and data (logical units (LUNS) stored on storage devices in the network, and wherein the access path policy comprises a set of access paths and access path attributes, associating with the specified change at least one component event, forecasting the effects of the at least one component event by evaluating conformance of the changed access path policy, and in the event of nonconformance, determining a root cause for the nonconformance, wherein forecasting the effects includes predicting the effects of the changes to the network, and wherein determining the root cause includes determining a logical order and a temporal order of the at least one component event, and generating an event sequence based on the logical and temporal order.

10. The process of claim 9, wherein the root cause is associated with a first event in the event sequence.

11. The process of claim 9, wherein generating the event sequence includes determining a relative order of the at least one component event based on semantics of a timestamp, a route for transmission of a timestamp, a multiplicity of messages with different timestamps for an identical event, or a causal relationship between events, or a combination thereof.

12. The process of claim 1, wherein the access path attributes consist of at least one of a number of hops within a valid logical access path, a level of end-to-end redundancy for a valid logical access path, and a number of allocated ports for a valid logical access path.

13. The process of claim 9, wherein the access paths consist of at least one of a number of hops within a valid logical access path, a level of end-to-end redundancy for a valid logical access path, and a number of allocated ports for a valid logical access path.

* * * * *